(12) United States Patent
Niwa et al.

(10) Patent No.: US 7,321,938 B2
(45) Date of Patent: Jan. 22, 2008

(54) DATA TRANSFER APPARATUS, NETWORK SYSTEM, AND DATA TRANSFER METHOD

(75) Inventors: Yoshikatsu Niwa, Kanagawa (JP); Shinya Masunaga, Tokyo (JP)

(73) Assignee: Sony Corporation, Tokyo (JP)

( * ) Notice: Subject to any disclaimer, the term of this patent is extended or adjusted under 35 U.S.C. 154(b) by 716 days.

(21) Appl. No.: 09/965,030

(22) Filed: Sep. 27, 2001

(65) Prior Publication Data

US 2002/0065942 A1 May 30, 2002

(30) Foreign Application Priority Data

Sep. 29, 2000 (JP) ............... 2000-302883

(51) Int. Cl.
*G06F 15/173* (2006.01)

(52) U.S. Cl. ............ 709/238; 709/249; 709/230; 710/305; 710/306; 370/392; 370/463; 370/466

(58) Field of Classification Search ........... 709/249, 709/238, 230; 710/306, 305; 370/392, 463, 370/466

See application file for complete search history.

(56) References Cited

U.S. PATENT DOCUMENTS

| | | | | |
|---|---|---|---|---|
| 6,131,169 A * | 10/2000 | Okazawa et al. | ............ | 714/7 |
| 6,370,369 B1 * | 4/2002 | Kraiem et al. | ............ | 455/277.1 |
| 6,449,647 B1 * | 9/2002 | Colby et al. | ............... | 709/226 |
| 6,625,745 B1 * | 9/2003 | Johnson et al. | ............... | 714/4 |
| 6,636,922 B1 * | 10/2003 | Bastiani et al. | ............. | 710/305 |
| 6,643,702 B1 * | 11/2003 | Yeung | ............ | 709/238 |
| 6,693,915 B1 * | 2/2004 | Lappetelainen et al. | .... | 370/468 |
| 6,725,285 B2 * | 4/2004 | Van De Meulenhof et al. | ............... | 710/8 |
| 6,728,244 B1 * | 4/2004 | Takabatake | ............... | 370/392 |
| 6,822,946 B1 * | 11/2004 | Wallace | ............... | 370/328 |
| 2003/0123427 A1 * | 7/2003 | Gaedke et al. | ............ | 370/349 |

FOREIGN PATENT DOCUMENTS

WO     WO 00 57263        9/2000

OTHER PUBLICATIONS

IEEE P1394.1 Working Group: "P1394.1 Draft Standard for High Performance Serial Bus Bridges Draft 0.10" IEEE Standards, 'Online! Aug. 23, 2000, XP002301333 Retrieved from the Internet: URL:http://grouper.ieee.org/groups/1394/1/> 'retrieved on Oct. 19, 2004.

(Continued)

*Primary Examiner*—David Wiley
*Assistant Examiner*—Kyung H Shin
(74) *Attorney, Agent, or Firm*—Frommer Lawrence & Haug LLP; William S. Frommer; Thomas F. Presson

(57) ABSTRACT

Whether the node to which data has been sent is connected to a bus is determined according to destination information, and, when it is determined that the node is not connected to the bus, predetermined error information is sent to the data transmission source. Therefore, data re-transmission is prevented and thereby the frequency band of a network is efficiently used.

6 Claims, 17 Drawing Sheets

OTHER PUBLICATIONS

David V. James, SONY: "Hiperlan-2 wireless informative annex as submitted to the p1394.1 committee" p1394.1 Working Group, 'Online! Oct. 12, 1999, XP002301334 Retrieved from the Internet: URL://http://grouper.ieee.org/groups/1394/1/Documents/> 'retrieved on Oct. 18, 2004.

Takashi Sato, PHILIPS: "1394.1 for phase 1/2/(3)" P1394.1 Working Group, 'Online! Oct. 14, 1999, XP002301335 Retrieved from the Internet: URL:http://grouper.ieee.org/groups/1394/1/Documents/> 'retrieved on Oct. 18, 2004.

* cited by examiner

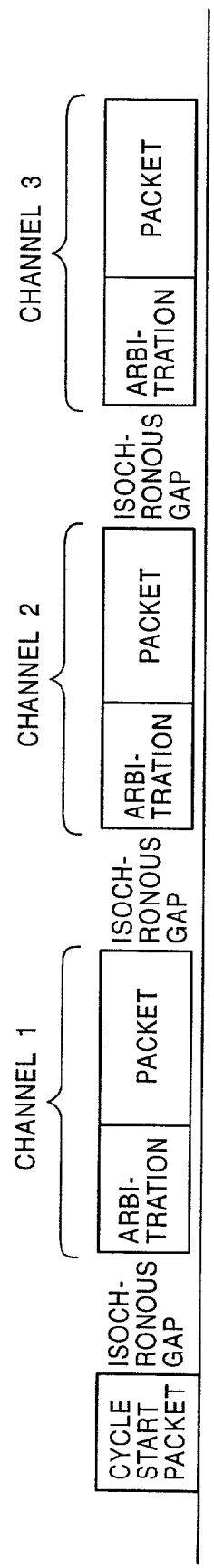

DIRECTION A : PACKET HAVING TRANSMISSION
              DESTINATION OTHER THAN BUS ID 2
DIRECTION B : ONLY PACKET HAVING TRANSMISSION
              DESTINATION OF BUS ID 2

FIG. 14

| TRANSMISSION DESTINATION BUS ID | PROCESSING |
|---|---|
| ID OF BUS TO WHICH THE OTHER-SIDE PORTAL IS CONNECTED | PORTAL RETURNS ack_complete FOR RESPONSE AND ack_pending FOR REQUEST. THEN, PORTAL TRANSMITS PACKET TO THE OTHER-SIDE PORTAL |
| OTHER THAN ABOVE | PORTAL IGNORES PACKET. (IT IS EXPECTED THAT ANOTHER PORTAL PERFORMS ROUTING.) |

FIG. 15

| TRANSMISSION DESTINATION BUS ID | PROCESSING |
|---|---|
| IDS OTHER THAN THAT OF BUS TO WHICH ITSELF IS CONNECTED | PORTAL RETURNS ack_complete FOR RESPONSE AND ack_pending FOR REQUEST. THEN, PORTAL TRANSMITS PACKET TO THE OTHER-SIDE PORTAL. |
| OTHER THAN ABOVE | PORTAL IGNORES PACKET. (NOT ACCESS TO OTHER BUSES) |

FIG. 18A

| 10 | phy_ID | 0 | L | gap_count | sp | BRIDGE BITS | c | pwr | p0 | p1 | p2 | i | 1 |
|---|---|---|---|---|---|---|---|---|---|---|---|---|---|
| LOGICAL INVERSE OF FIRST QUADLET ||||||||||||||

FIG. 18B

| VALUE | DEFINITION | REMARKS |
|---|---|---|
| 00b | NON-BRIDGE DEVICE | CONVENTIONAL 1394 DEVICE |
| 01b | DEVICE WITH BRIDGE FUNCTION | DEVICE HAVING BRIDGE FUNCTION |
| 10b | BRIDGE AS DEFINED BY P1394.1 | P1394.1 DEVICE |
| 11b | BRIDGE AS DEFINED BY P1394.1 | P1394.1 DEVICE |

FIG. 19

| NODE ID | RESERVED (2 BITS) | VIRTUAL ID (6 BITS) |
|---|---|---|
| 0 | 00 | 4 |
| 1 | 00 | 3 |
| 2 | 00 | 5 |
| 3 | 00 | 2 |
| 4 | 00 | 1 |
| 5 | 00 | 7 |
| 6 | 00 | 0 |
| 7 | 00 | 6 |

FIG. 20

| NODE ID | RESERVED (2 BITS) | BRIDGE (1 BIT) | VIRTUAL ID (6 BITS) |
|---|---|---|---|
| 0 | 00 | 0 | 4 |
| 1 | 00 | 0 | 3 |
| 2 | 00 | 0 | 5 |
| 3 | 00 | 1 | 2 |
| 4 | 00 | 1 | 1 |
| 5 | 00 | 0 | 7 |
| 6 | 00 | 0 | 0 |
| 7 | 00 | 0 | 6 |

FIG. 21

| TRANSMISSION DESTINATION BUS ID | | PROCESSING |
|---|---|---|
| ID OF BUS TO WHICH THE OTHER-SIDE PORTAL IS CONNECTED | | PORTAL RETURNS ack_complete FOR RESPONSE AND ack_pending FOR REQUEST. THEN, PORTAL TRANSMITS PACKET TO THE OTHER-SIDE PORTAL |
| OTHER THAN ABOVE | PORTAL HAVING LARGEST VIRTUAL ID | WHEN Phy ID OF PORTAL CONNECTED TO BUS MATCHES TRANSMISSION DESTINATION BUS ID, PORTAL IGNORES PACKET. IN THE OTHER CASES, PORTAL HANDLES PACKET AS ERROR AND RETURNS ack_address_err |
| | OTHER THAN ABOVE | PORTAL IGNORES PACKET (IT IS EXPECTED THAT ANOTHER PORTAL APPLIES PROCESSING) |

DATA TRANSFER APPARATUS, NETWORK SYSTEM, AND DATA TRANSFER METHOD

BACKGROUND OF THE INVENTION

1. Field of the Invention

The present invention relates to data transfer apparatuses, network systems, and data transfer methods, and more particularly, to those suited to a digital-serial-data interface apparatus which performs arbitration for a bus use right prior to data transfer.

2. Description of the Related Art

There has been known the IEEE-1394 high-performance serial bus specification (hereinafter called the IEEE-1394 specification) as an interface specification which supports high-speed data transfer and real-time transfer and which is to be used for an interface for multimedia-data transfer.

In this IEEE-1394 specification, data transfer speeds of 100 Mbps (98.304 Mbps), 200 Mbps (196.608 Mbps), and 400 Mbps (393.216 Mbps) are defined, and a 1394 port having a higher transfer speed can be used at a lower transfer speed. With this feature, the data transfer speeds of 100 Mbps, 200 Mbps, and 400 Mbps can be used at the same time in an identical network.

The IEEE-1394 specification employs a transfer format conforming to a data/strobe link (DS-Link) encoding method, in which transfer data is converted to two signals, a data signal and a strobe signal for compensating for the data signal, and a clock is generated by applying an exclusive OR operation to the two signals, as shown in FIG. 1.

In addition, a cable 1 is specified, which has a structure in which two sets of twisted pairs (signal lines) 3 each shielded by a first shield layer 2 and power lines 4 are bundled and then shielded by a second shield layer 5, as shown by a cable structure illustrated in a sectional view of FIG. 2.

In the IEEE-1394 specification, two types of connection methods, a daisy chain and a node branch, can be used. In the daisy chain, up to 16 nodes (units having a 1394 port) can be connected and the maximum length between nodes is 4.5 m. As shown in FIG. 3, with the node branch being used together, up to 63 nodes (physical node addresses) can be connected.

In the IEEE-1394 specification, a cable having the above structure can be connected and disconnected while a unit is operating, namely, while the power is on. When a node is added or removed, a 1394 network is automatically re-structured. In this case, connected node units are automatically recognized and the IDs and arrangement of the connected units are managed by an interface.

FIG. 4 shows the components and protocol architecture of an interface conforming to the IEEE-1394 specification. The interface is divided into hardware and firmware.

The hardware is formed of a physical layer (PHY) and a link layer.

The physical layer directly drives signals conforming to the IEEE-1394 specification. The link layer is provided with a host interface and an interface with the physical layer.

The firmware includes a transaction layer formed of a management driver which applies actual operations to the interface conforming to the IEEE-1394 specification, and a management layer formed of a network-management driver conforming to the IEEE-1394 specification, called serial bus management (SBM).

An application layer includes software used by the user, and management software which interfaces the transaction layer and the management layer.

In the IEEE-1394 specification, transfer operations performed in a network are called sub-actions, and the following two types of sub-actions are specified. As the two sub-actions, asynchronous transfer mode called "asynchronous," and synchronous transfer mode which assures a transfer frequency band, called "isochronous," are defined.

Each sub-action is further divided into three parts. They are transfer states called "arbitration," "packet transmission," and "acknowledgement." In the "isochronous" mode, the "acknowledgement" state is omitted.

In an asynchronous sub-action, asynchronous transfer is performed. In FIG. 5, which indicates transition states along the time axis in the transfer mode, a first sub-action gap indicates that a bus is idling. By monitoring the period of a sub-action gap, it is determined whether the previous transfer is finished and new transfer is possible.

When an idling state continues for more than a predetermined period, a node which wants to transfer data determines that the bus is available, and performs arbitration in order to obtain the bus control right. As shown in FIG. 6A and FIG. 6B, a node A serving as a root actually determines whether the bus is stopped.

Next, a node which has obtained the bus control right in arbitration executes data transfer, namely, packet transmission. After the data transfer, a node which has received the data sends back an ACK (ACK: receiving-confirmation return code) corresponding to the result of receiving of the transferred data to execute acknowledgement. With the execution of this application, both the transmission node and the receiving node can check by the contents of the ACK that the transfer was successfully performed.

Then, the state returns again to a sub-action gap, namely, a bus idling state, and the above-described transfer operations are repeated.

An isochronous sub-action basically performs transfer having the same structure as asynchronous transfer. As shown in FIG. 7, a higher priority is given to the execution of isochronous transfer than that of asynchronous transfer in an asynchronous sub-action.

Isochronous transfer in an isochronous sub-action follows a cycle-start packet issued by the root node at a frequency of about 8 kHz, and has a priority over asynchronous transfer in an asynchronous sub-action. Therefore, the mode is the transfer mode which assures a transfer frequency band, and real-time data transfer is implemented.

When a plurality of nodes perform isochronous transfer of real-time data at the same time, a channel ID for differentiating a content (transmitting node) is assigned to transfer data and only the required real-time data is received.

FIG. 8 shows the structure of an address space in the IEEE-1394 specification. The structure conforms to a CSR architecture (hereinafter called a CSR architecture) having 64-bit fixed addressing, defined in the ISO/IEC 13213 specification.

As shown in FIG. 8, higher 16 bits indicate a node ID in each address to give an address space to a node. The node ID is divided into a 10-bit bus number and a six-bit node number, and higher 10 bits indicate a bus ID and lower six bits indicate a physical ID. Since either field uses the value formed of all "1" bits for a special purpose, this addressing method gives 1023 buses and 63 separately addressable nodes for each bus.

In the above-described IEEE-1394 specification, however, various restrictions apply in terms of a scale and ease of handling, such as those in the number of connected units, a hop count, and a transfer frequency band. To relieve these restrictions and to expand a network scale, a 1394 bus bridge specification has been examined.

In a status control register employed in the IEEE-1394 specification, a 10-bit bus number field and a six-bit node number field are defined, and one bus is formed according to the node number field.

Among these fields, the node number field indicates 63 nodes in one bus and their behaviors are specified in the IEEE-1394 specification. In contrast, with the use of the 10-bit bus number field, when numbers are assigned to this field, up to 1032 buses are generated. A protocol for the entire 1394 network will be specified in the 1394 bus bridge specification.

A 1394 bridge has a function for propagating data over buses and needs to be disposed between buses. The 1394 bridge is formed of one set of two nodes called portals. Each portal performs processing for both the bus to which the portal is connected and the bus to which the other portal is connected.

FIG. 9 shows a 1394 network using such a 1394 bridge. A circle connected between 1394 buses indicate a 1394 bridge, and each semi-circle indicates a portal. In addition, as shown in FIG. 10, up to 1023 buses can be connected by using connections between buses with the use of 1394 bridges.

Two standardization operations have been currently performed for the 1394 bus bridge. One is that performed by an IEEE-1394.1 working group and its contents are disclosed as a draft. The other is that performed by a broadband radio access network (BRAN) project under European Telecommunication Standard Institute (ETSI) in Europe, and its contents are also disclosed as a draft.

The difference between them is that the IEEE-1394.1 working group has been examining the 1394 bus bridge for general use, in which up to 1023 buses can be used and the maximum hop count is 1022 whereas the BRAN project has been examining for home use with simplified functions, thereby generating a slight restriction on a topology structure.

A 1394 network of the BRAN specification supports up to 64 buses and up to two hops, and has a structure in which a number of buses (leaf buses) are connected around a central bus (branch bus) as shown in FIG. 11.

Bus-ID assignment is also simplified. As shown in FIG. 11, virtual IDs of 0 to 62 are assigned to portals connected to the branch bus. The virtual IDs are also used as the bus IDs of the leaf buses connected to the other-side portals, and a bus ID of 63 is assigned to the branch bus. Bus-ID assignment is automatically performed in this way.

The above-described BRAN specification for the 1394 bridge is simplified, and has an advantage that packet transfer can be performed without referring to a routing table in asynchronous packet transfer performed over a bridge.

Such a case will be specifically described by referring to FIG. 12. In a 1394 network having a structure like that shown in FIG. 12, it is assumed that asynchronous packet transfer is performed in a direction indicated by an arrow A and in a direction indicated by an arrow B. In packet transfer in the direction indicated by the arrow A, when the transmission destination bus ID of an asynchronous packet is not the own bus ID, namely, the transmission destination is other than the bus ID 2, the packet is forwarded in the direction indicated by the arrow A.

In packet transfer in the direction indicated by the arrow B, when the transmission destination bus ID of an asynchronous packet is equal to the bus ID of the bus connected there, namely, only when the packet is a packet bound for the bus ID 2, the packet is transmitted in the direction indicated by the arrow B.

As described above, asynchronous packet transfer is achieved over a bridge without using a routing table. However, what kind of processing is applied to a packet having the bus ID indicated by the transmission destination address, which does not exist on the current 1394 network, is not defined.

Therefore, when an asynchronous packet is sent to a destination which is not on the network, it is not reported to the transmission source that the packet is an error packet and acknowledgement is not returned. The transmission source may repeat meaningless re-transmission.

SUMMARY OF THE INVENTION

The present invention has been made in consideration of the above point. Accordingly, an object of the present invention is to provide a data transfer apparatus, a network system, and a data transfer method which, if a packet having a transmission destination node which does not exist is erroneously transmitted, regard the packet as an error packet and perform normal error processing.

The foregoing object is achieved in one aspect of the present invention through the provision of a data transfer apparatus for connecting buses and for transmitting data transferred through its own bus among the buses to another bus among the buses, if necessary, according to destination information attached to the data, including transmitting means for determining according to the destination information whether the node serving as the destination of the data is connected to one of the buses, and, when it determines that the node is not connected, for transmitting predetermined error information to the data transmission source. Therefore, data re-transmission is prevented, and thereby the frequency band of a network is efficiently used.

The foregoing object is achieved in another aspect of the present invention through the provision of a network system in which a plurality of buses are connected through a data transfer apparatus for connecting buses and for transmitting data transferred through its own bus among the buses to another bus among the buses, if necessary, according to destination information attached to the data, wherein the data transfer apparatus includes transmitting means for determining according to the destination information whether the node serving as the destination of the data is connected to one of the buses, and, when it determines that the node is not connected, for transmitting predetermined error information to the data transmission source. Therefore, data re-transmission is prevented, and thereby the frequency band of a network is efficiently used.

The foregoing object is achieved in still another aspect of the present invention through the provision of a data transfer method for a data transfer apparatus for connecting buses and for transmitting data transferred through its own bus among the buses to another bus among the buses, if necessary, according to destination information attached to the data, the data transfer method including a first step of determining according to the destination information whether the node serving as the destination of the data is connected to one of the buses; and a second step of, when it is determined that the node is not connected, transmitting predetermined error information to the data transmission source. Therefore, data re-transmission is prevented, and thereby the frequency band of a network is efficiently used.

BRIEF DESCRIPTION OF THE DRAWINGS

FIG. 7 is an outlined view showing packets in isochronous transfer.

FIG. 14 is an outlined view showing packet processing in a portal on a branch bus.

FIG. 15 is an outlined view showing packet processing in a portal on a leaf bus.

FIG. 18A and FIG. 18B are outlined views showing bridge bits in a self ID packet.

FIG. 19 is an outlined view showing a correspondence table between node IDs and virtual IDs.

FIG. 20 is an outlined view showing a correspondence table between node IDs and virtual IDs.

FIG. 21 is an outlined view showing packet processing in a portal on a branch bus.

DESCRIPTION OF THE PREFERRED EMBODIMENTS

Figure 1:
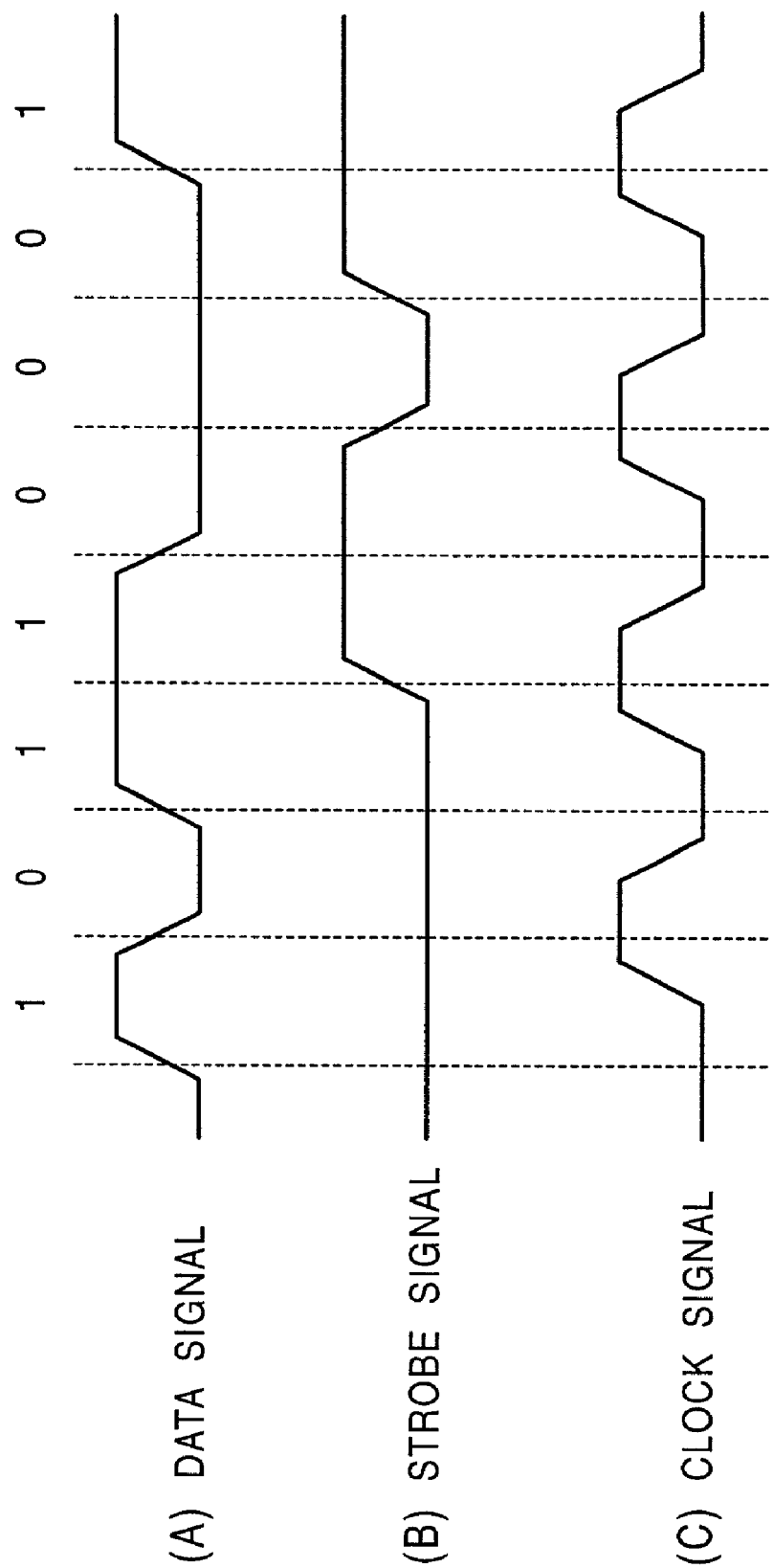
FIG. 1 is a timing chart of signals in data transfer in the IEEE-1394 specification.
Figure 2:
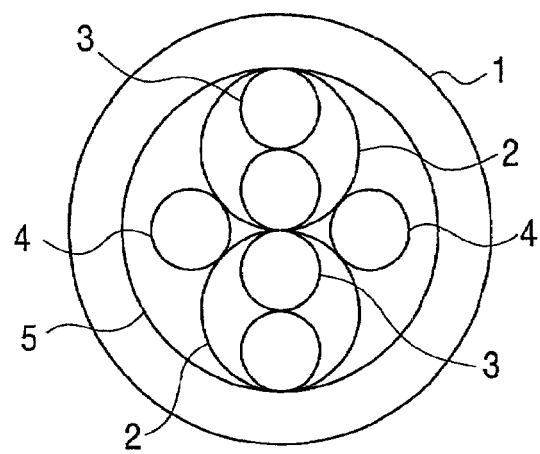
FIG. 2 is a sectional view of a cable specified in the IEEE-1394 specification.
Figure 3:
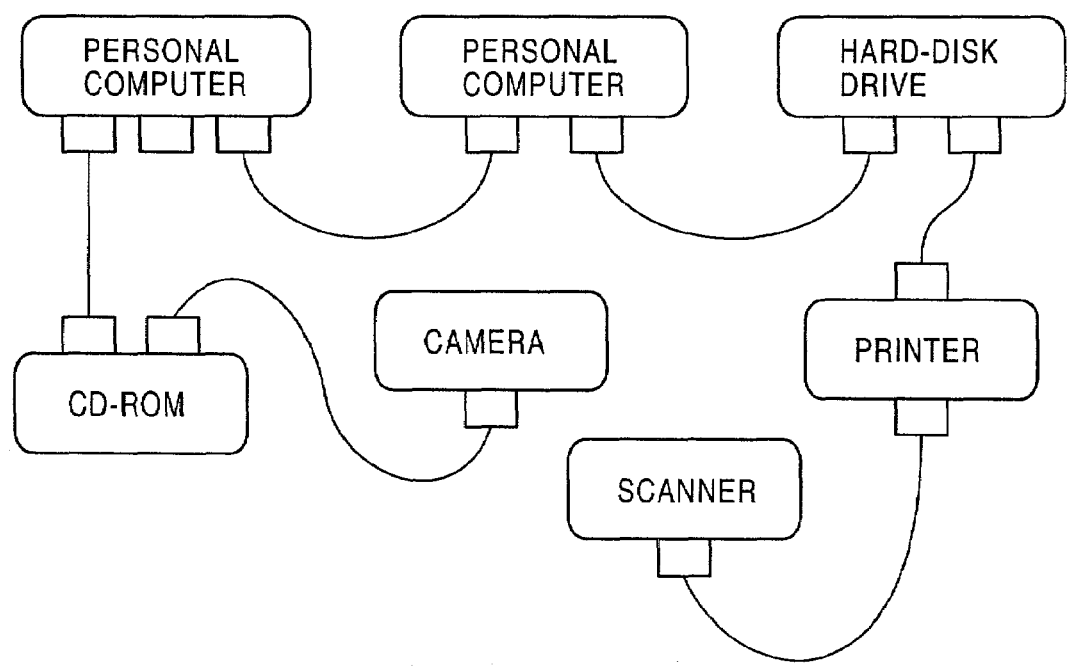
FIG. 3 is an outlined view showing the structure of a network which employs the IEEE-1394 specification.
Figure 4:
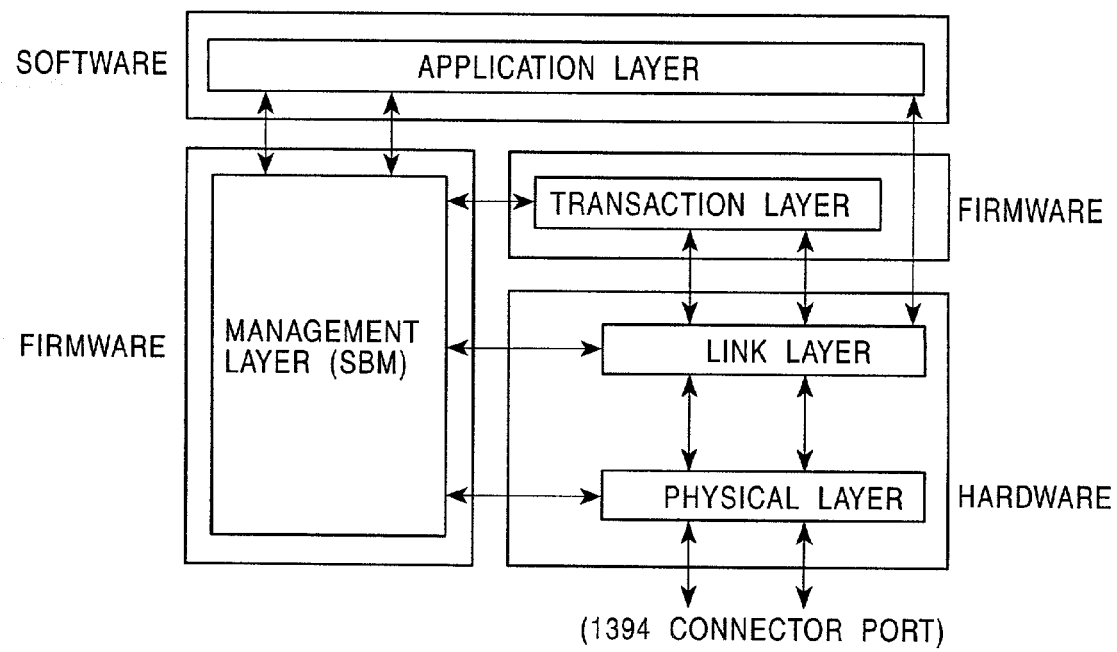
FIG. 4 is an outlined view showing the components and protocol architecture of an interface conforming to the IEEE-1394 specification.
Figure 5:
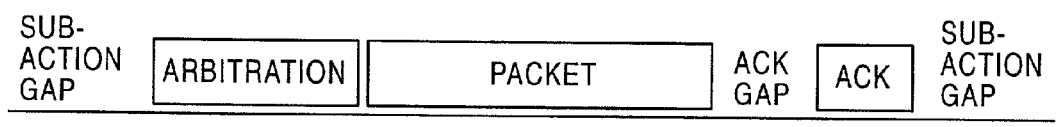
FIG. 5 is an outlined view showing a packet in asynchronous transfer.
Figure 6A:
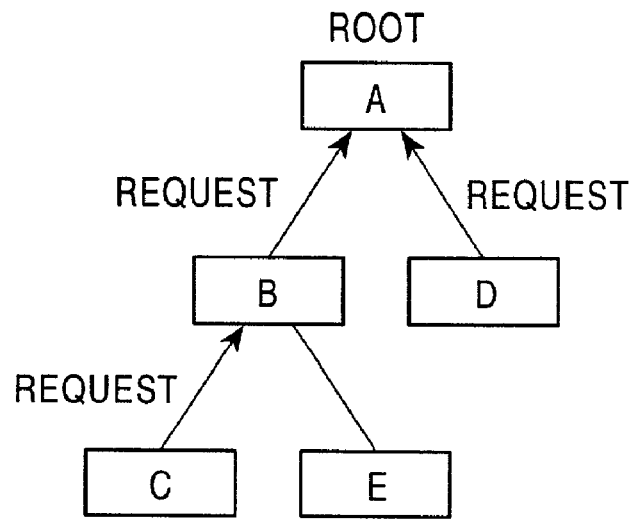
FIG. 6A and FIG. 6B are outlined views showing bus-use-right acquisition states caused by arbitration.
Figure 6B:
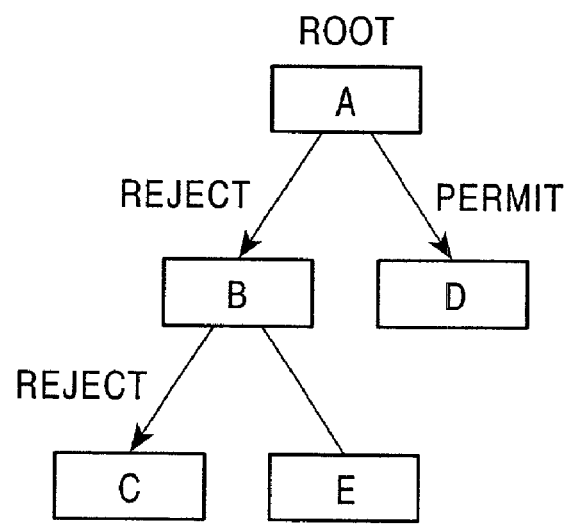
Figure 8:
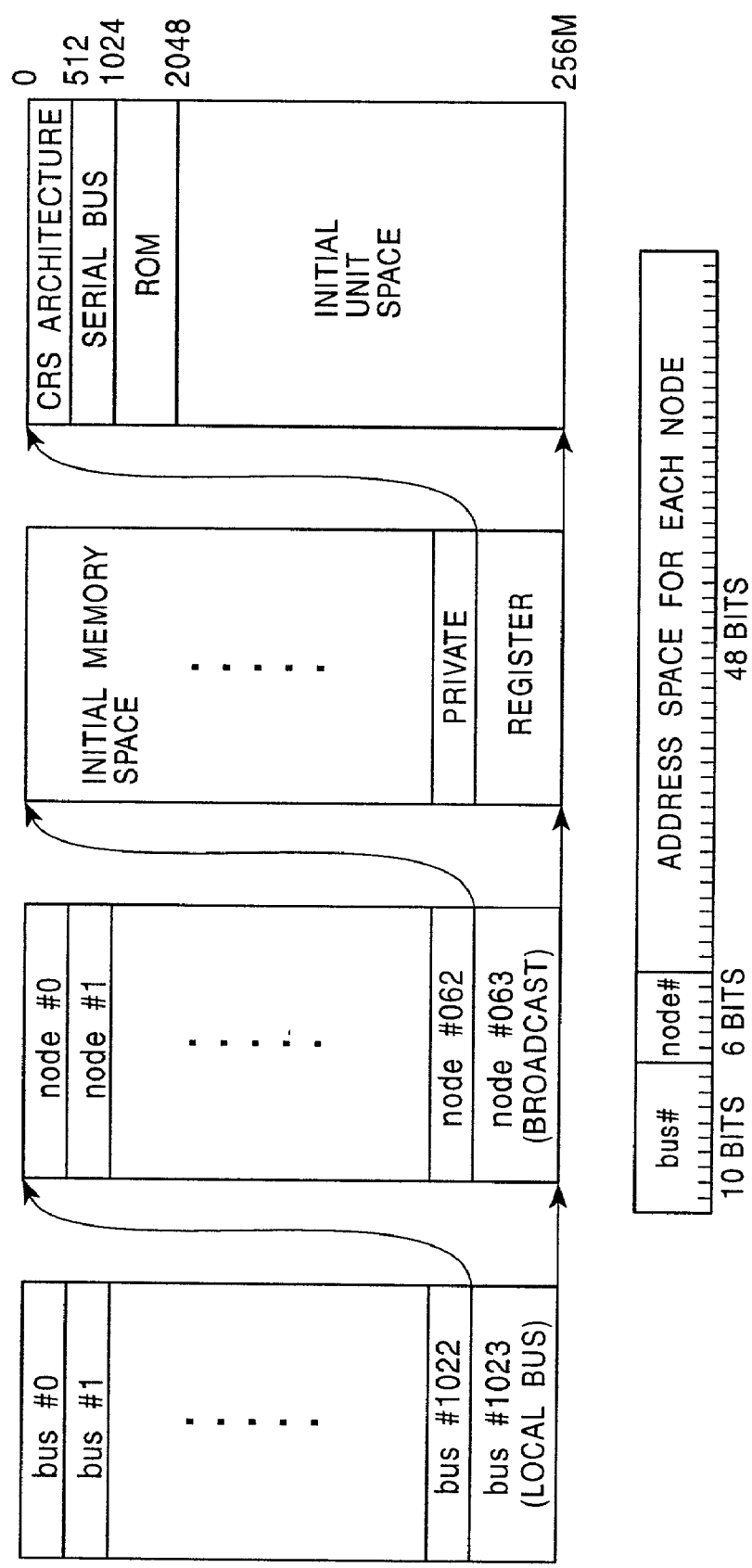
FIG. 8 is an outlined view showing addressing in a CSR architecture.
Figure 9:
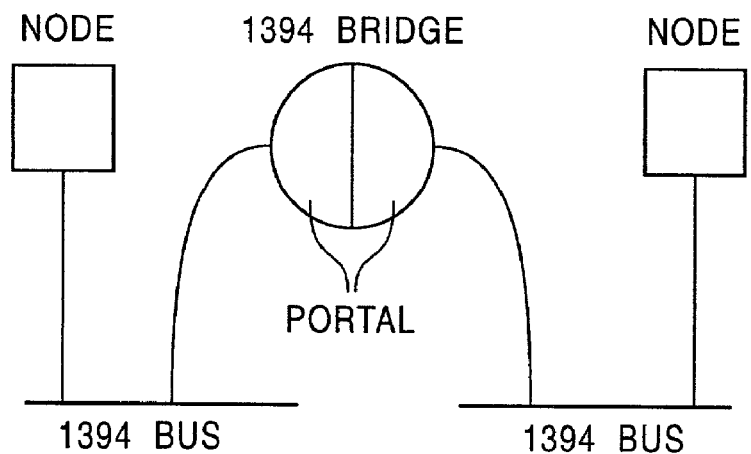
FIG. 9 is an outlined view showing the basic structure of a 1394 network using a 1394 bridge.
Figure 10:
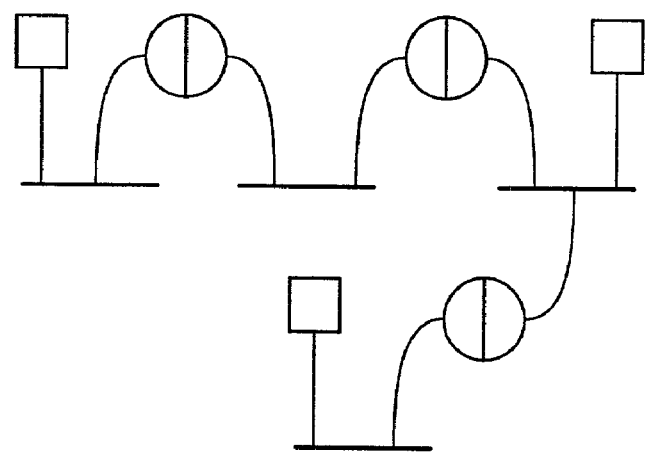
FIG. 10 is an outlined view showing the structure of a 1394 network using a plurality of 1394 bridges.
Figure 11:
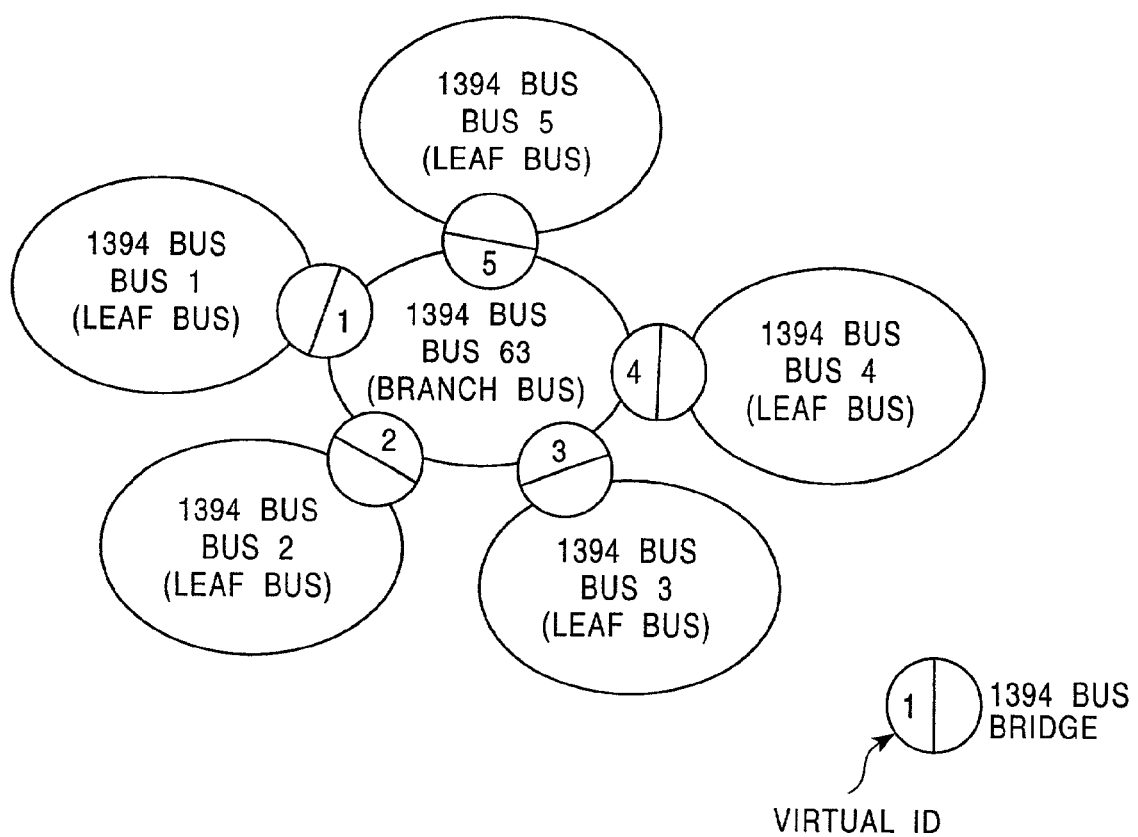
FIG. 11 is an outlined view showing the structure of a 1394 network of the BRAN specification.
Figure 12:
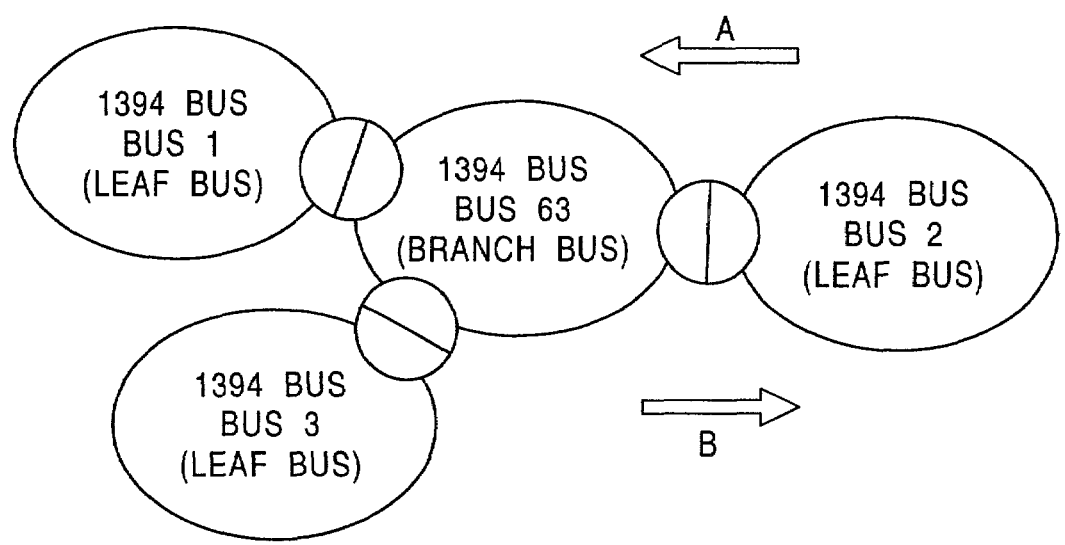
FIG. 12 is an outlined view showing routing in a 1394 network of the BRAN-specification.

An embodiment of the present invention will be described in detail by referring to the drawings.

In a 1394 bridge of the BRAN specification, asynchronous transmission over the bridge is allowed. A method for performing asynchronous transfer over the bridge will be described first.

Figure 13:
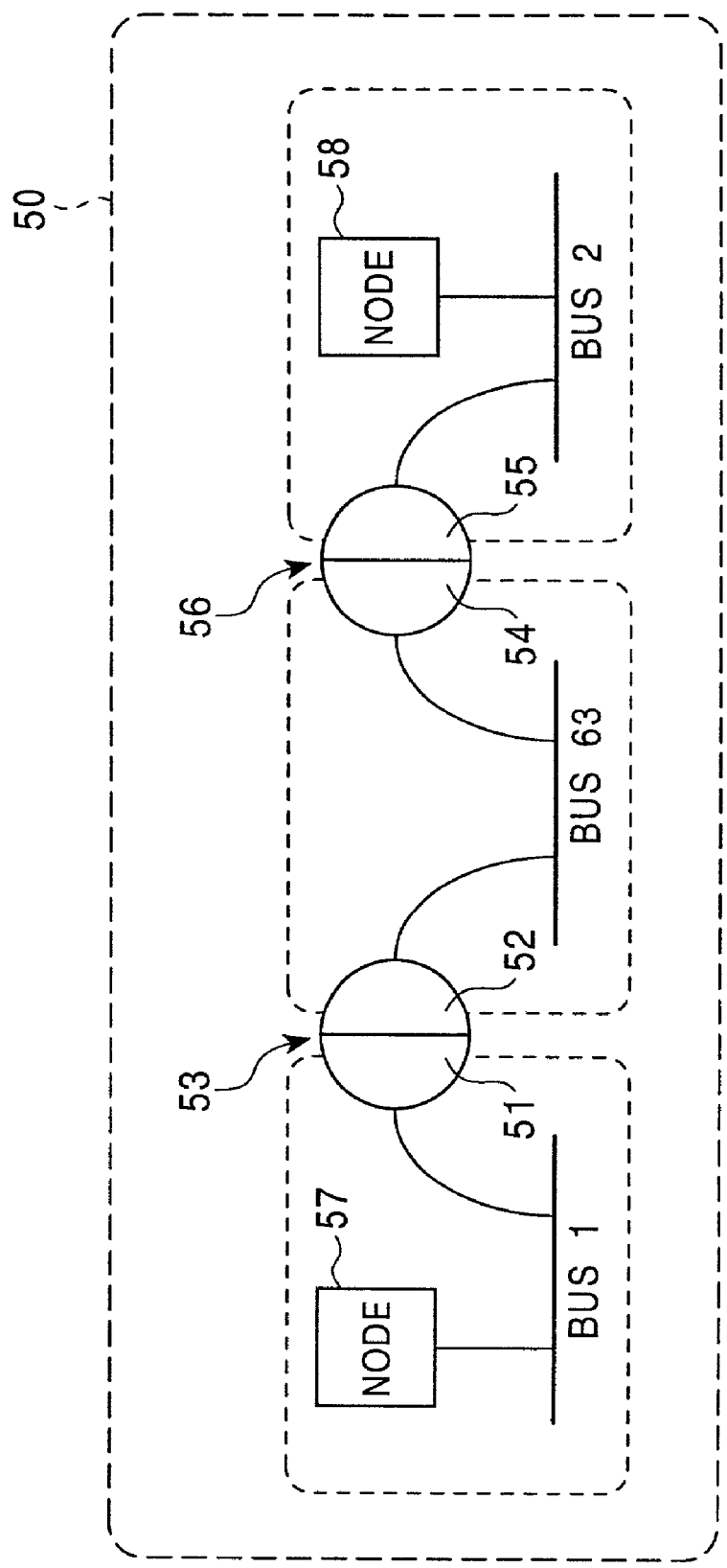
FIG. 13 is an outlined view showing the structure of a 1394 network of the BRAN specification.

When a node existing on a bus connected to the 1394 bridge sends an asynchronous packet to a node existing on a bus other than the local bus, the bridge serves as a repeater point. A case like that shown in FIG. 13 will be considered.

A 1394 network 50 shown in the figure is formed of a bridge 53 formed of a portal 51 connected to a bus BUS1 and a portal 52 connected to a bus BUS63, a bridge 56 formed of a portal 54 connected to the bus BUS63 and a portal 55 connected to a bus BUS2, a node 57 connected to the bus BUS1, and a node 58 connected to the bus BUS2.

In such a structure, the bus BUS63 connected to two portals or more is called a branch bus, and the bus BUS1 and the bus BUS2 each connected to only one portal are called leaf buses.

When the node 57 performs packet transmission to the node 58, a packet sent from the node 57 is first received by the portal 51. Receiving the packet, the portal 51 determines whether the packet is to be forwarded to an adjacent bus. In other words, the transmission destination bus ID of the packet is checked.

When the transmission destination bus ID is not the local-bus ID, the packet is regarded as that bound for a node disposed on another bus, and is actually forwarded. To forward the packet, the portal 51 first returns an ACK indicating that the packet has been received, to the node 57.

Then, the portal 51, which received the packet, passes the packet to the portal 52, positioned at the other side of the bridge 53, and the portal 52 sends the received packet to the bus BUS63 connected thereto.

The packet, which was sent from the portal 52 to the bus BUS63, is then received by the portal 54. Receiving the packet, the portal 54 determines whether the received packet is to be forwarded to an adjacent bus, in the same way as the portal 51 did.

It is noted that this determination processing differs depending on whether portal 54 is connected to a branch bus or to a leaf bus. The processing is shown in FIG. 14 and FIG. 15.

Since the portal 54 is connected to a branch bus, whether the packet is to be forwarded means whether the bus ID of the transmission destination address matches the adjacent bus ID.

In the present case, since the bus ID of the transmission destination address is the bus BUS2, the portal 54 determines that the packet is to be forwarded, and passes the packet to the portal 55, positioned at the other side. The portal 54 also returns an ACK indicting that the packet has been received, to the portal 52.

The portal 54, which received the packet, sends the packet to the bus BUS2 connected thereto, and the node 58, disposed on the bus BUS2, can receive the packet. Receiving the packet, the node 58 returns an ACK to the portal 55 to report that the packet has been received. Through such processing, asynchronous transmission is performed over bridges.

When the node 58 sends a packet to the node 57, the same processing as that described above is performed through the above-described path in the opposite direction to achieve isochronous packet transmission over bridges.

The method for performing asynchronous transmission over 1394 bridges of the BRAN specification has been described. The behaviors in the transmission are specified assuming that the transmission destination of an asynchronous packet exists. Behaviors which should be taken if the transmission destination bus is disconnected for some reason are not considered.

Figure 16:
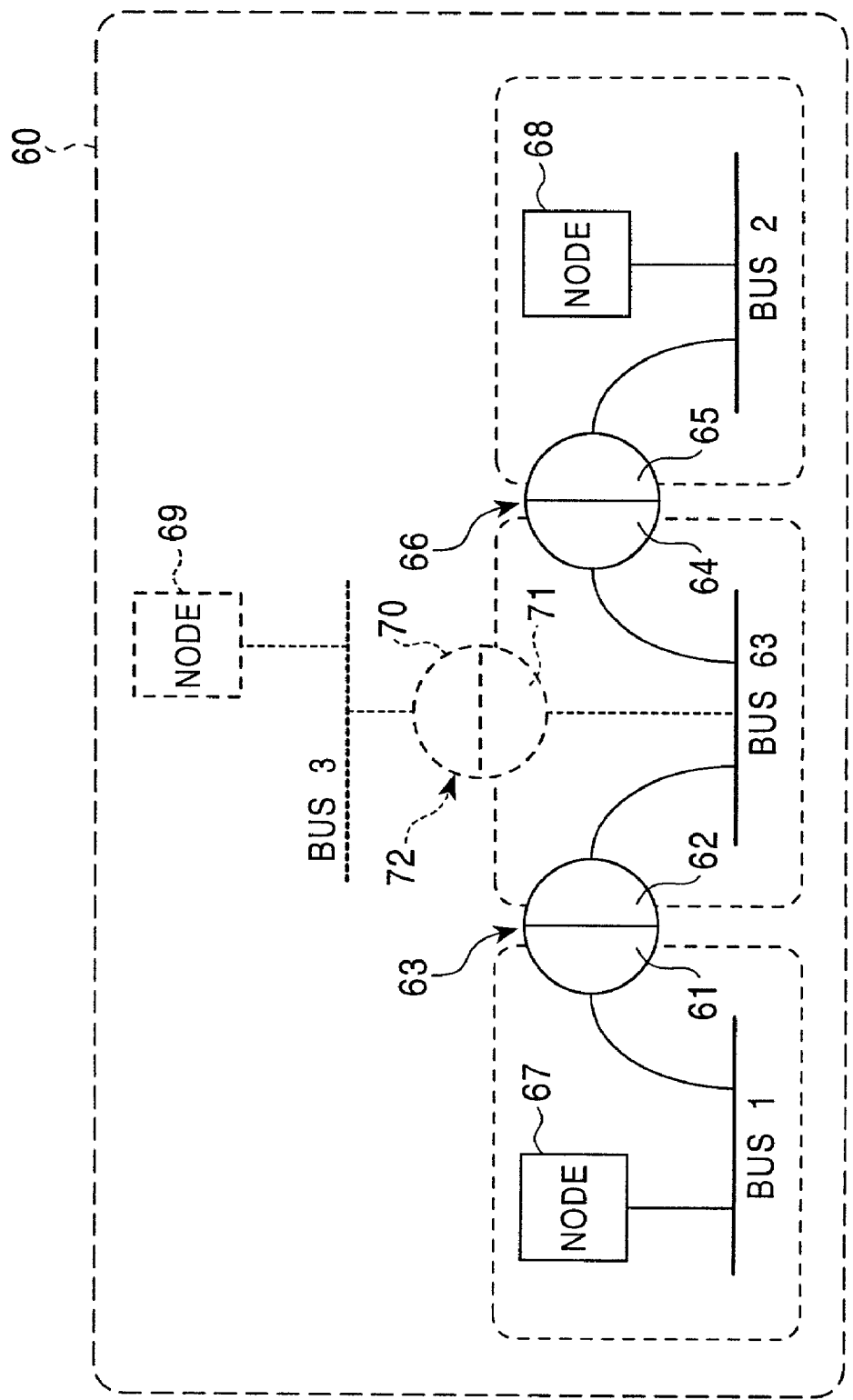
FIG. 16 is an outlined view showing the structure of a 1394 network of the BRAN specification.

Behaviors which should be taken in such a case will be specifically described for a case shown in FIG. 16. A 1394 network 60 shown here is formed of a bridge 63 formed of a portal 61 connected to a bus BUS1 and a portal 62 connected to a bus BUS63, a bridge 66 formed of a portal 64 connected to the bus BUS63 and a portal 65 connected to a bus BUS2, a node 67 connected to the bus BUS1, and a node 68 connected to the bus BUS2.

For convenience of the description, an imaginary bus BUS3 which does not exist in the 1394 network 60 is defined, an imaginary node 69 connected to the bus BUS3 is defined, and a case in which the node 67 sends a packet to the node 69 will be considered.

A packet sent from the node 67 is first received by the portal 61. Receiving the packet, the portal 61 determines whether the packet is to be forwarded to an adjacent bus. In other words, the transmission destination bus ID of the packet is checked.

When the transmission destination bus ID is not the local-bus ID, the packet is regarded as that bound for a node disposed on another bus, and is actually forwarded. To forward the packet, the portal 61 first returns an ACK indicating that the packet has been received, to the node 67. Then, the portal 61, which received the packet, passes the packet to the portal 62, positioned at the other side of the bridge 63, and the portal 62 sends the received packet to the bus BUS63 connected thereto.

For the packet sent from the portal 62 to the bus BUS63, however, a portal which is to receive the packet does not exist. A node connected to a branch bus receives only a packet which is bound for the bus ID to which the portal disposed at the other side of the bridge is connected. The corresponding portal does not exist. Therefore, the packet is not received on the bus BUS63.

An ACK is not returned to the portal 62, which transmitted the packet, and time-out occurs. In such a case, since the cause of the error cannot be identified, meaningless re-transmission may be performed. This causes additional traffic to occur on the bus, and is not preferred in terms of structuring the 1394 network 60.

In the present invention, a method for performing appropriate error processing when the transmission destination bus of an asynchronous packet does not exist is specified. An embodiment of the present invention will be described below by referring to FIG. 17.

A 1394 network 80 shown here is formed of a bridge 83 formed of a portal 81 connected to a bus BUS1 and a portal 82 connected to a bus BUS63, a bridge 86 formed of a portal 84 connected to the bus BUS63 and a portal 85 connected to a bus BUS2, a node 87 connected to the bus BUS1, and a node 88 connected to the bus BUS2.

For convenience of the description, an imaginary bus BUS3 which does not exist in the 1394 network 80 is defined, an imaginary node 89 connected to the bus BUS3 is defined, and a case in which the node 87 sends a packet to the node 89 will be considered.

A packet sent from the node 87 is first received by the portal 81. Receiving the packet, the portal 81 determines whether the packet is to be forwarded to an adjacent bus. In other words, the transmission destination bus ID of the packet is checked.

When the transmission destination bus ID is not the local-bus ID, the packet is regarded as that bound for a node disposed on another bus, and is actually forwarded. To forward the packet, the portal 81 first returns an ACK indicating that the packet has been received, to the node 87.

The portal 81, which received the packet, passes the packet to the portal 82, positioned at the other side of the bridge 83, and the portal 82 sends the received packet to the bus BUS63 connected thereto. For the packet sent from the portal 82 to the bus BUS63, however, a portal which is to receive the packet does not exist.

A node connected to a branch bus receives only a packet which is bound for the bus ID to which the portal disposed at the other side of the bridge is connected. The corresponding portal does not exist. Therefore, a method for applying acknowledgement processing to the packet in the above-described case is defined.

One of portals connected to the branch bus is selected. In this selection, a portal having the largest, assigned, virtual ID may be selected. In the above case, the portal 82 and the portal 84 are connected to the branch bus, and the portal 84 has a larger virtual ID. Therefore, the portal 84 is selected.

The portal 84 can obtain information indicating how many bridges are connected to the branch bus. This information is obtained by checking the contents of self ID packets received when the bus is reset. A self ID packet which each node sends at a bus reset includes bits indicating whether the node itself is a bridge, as shown in FIG. 18A and FIG. 18B, and receiving of this packet enables the determination.

Since the self ID packet includes information related to the node ID, the node ID of each portal can be obtained as well as the number of bridges connected to the branch bus. Each portal generates a table indicating the correspondence between the node IDs and the virtual IDs for nodes disposed on a bus, as shown in FIG. 19, and holds it.

From the information obtained as described above, the portal 84 can obtain in advance the number of bridges connected to the branch bus and the bus IDs of connected buses. As shown in FIG. 20, when a flag indicating a portal is added to the table indicating the correspondence between the node IDs and the virtual IDs, the above information can be managed. According to this information, error processing is applied to a packet having a unclear destination.

The portal 84 usually forwards only asynchronous packets bound for the bus BUS2, which is the bus connected to the other side of the bridge. The following check is also applied to packets which the portal 84 itself does not forward.

When the transmission destination bus ID of a received packet is checked and it is determined that the packet is bound for a bus other than the bus BUS2, whether the transmission destination bus ID exists on the 1394 network 80 is checked. This checking is performed by checking the virtual IDs of portals connected to the branch bus.

In the case, the transmission destination bus ID is "3" whereas only portals having virtual IDs of "1" and "2" are connected to the branch bus. Therefore, it is found that the bus BUS3, which is the transmission destination, does not exist.

When the portal 84 understands that the packet is bound for the destination which does not exist on the network, the portal 84 returns ack_address_err to the transmission source. When the transmission source node receives this acknowledgement, it understands that the transmission destination does not exist. Therefore, re-transmission (retry) is not performed. Error processing is thus performed. FIG. 21 shows the processing in a table.

Figure 17:
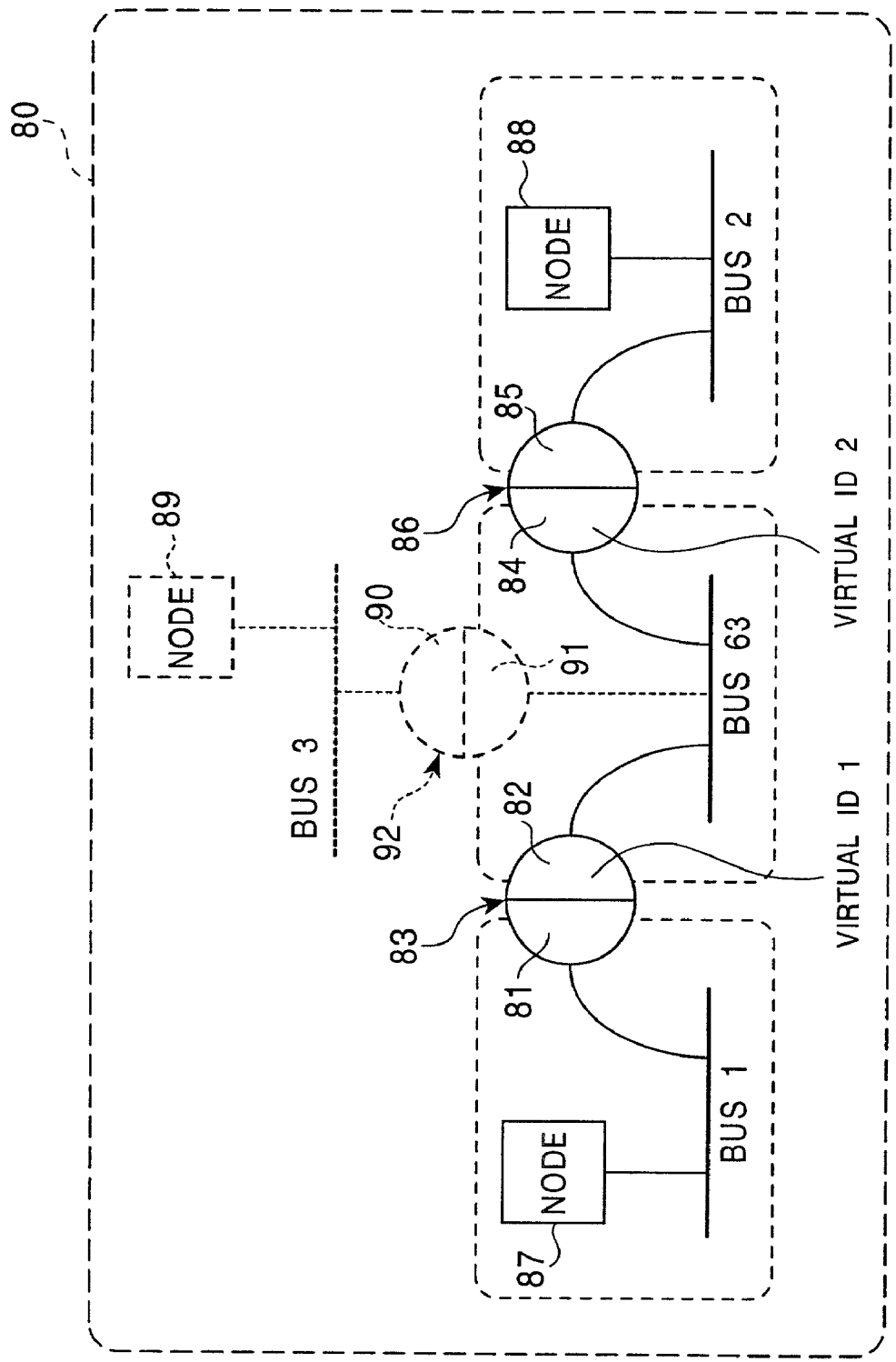
FIG. 17 is an outlined view showing the structure of a 1394 network of the BRAN specification.
Figure 22:
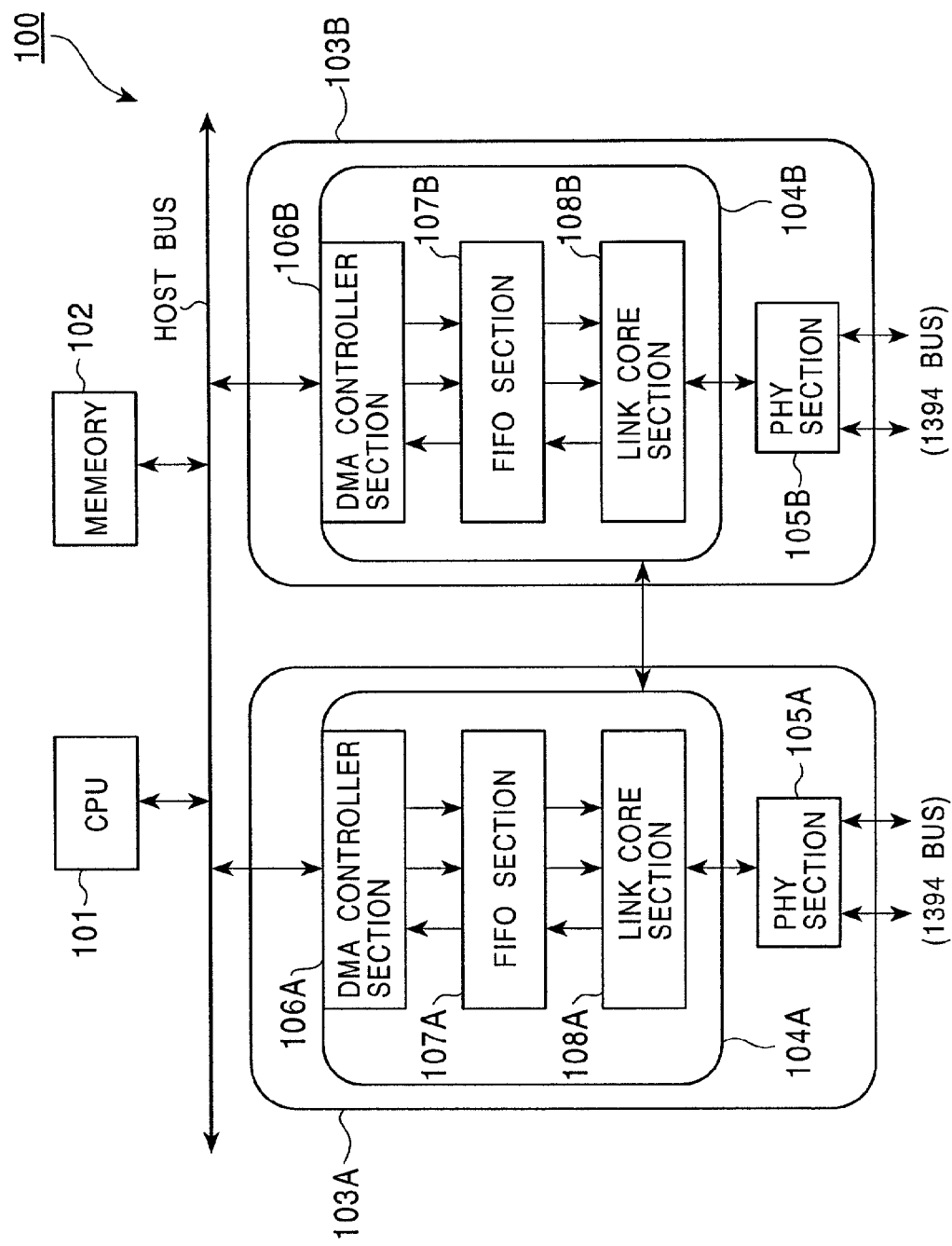
FIG. 22 is a block diagram showing the structure of an interface apparatus having a bridge function.

FIG. 22 shows the structure of an interface apparatus which implements the bridges 83 and 86 shown in FIG. 17. As shown in FIG. 22, an interface apparatus 100 which implements a bridge function is formed of a central processing unit (CPU) 101, a memory 102, and portals 103A and 103B all connected to a host bus HOSTBUS.

The portal 103A is formed of a link section 104A and a PHY section 105A. The link section 104A is formed of a direct memory access (DMA) controller section 106A, a first-in first-out (FIFO) section 107A, and a link core section 108A. In the same way, the portal 103B is formed of a link section 104B and a PHY section 105B. The link section 104B is formed of a DMA controller section 106B, a FIFO section 107B, and a link core section 108B.

The CPU 101 generates a table indicating the correspondence between node IDs and virtual IDs, as shown in FIG. 19 and FIG. 20, and makes the link core sections 108A and 108B hold the table. The link core sections 108A and 108B refer to the table indicating the correspondence between the node IDs and the virtual IDs to determine whether a received packet is to be forwarded. When the link core sections 108A and 108B determine that the packet is not to be forwarded, they perform error processing. When it is determined that the packet is to be forwarded, the sections directly transmits and receives the packet.

The digital-serial-data interface apparatus 100 having a 1394-bridge function of the BRAN specification and having the foregoing structure determines whether the bus number indicated by the transmission destination address of an asynchronous packet transmitted on the bus exists. When the destination bus does not exist, the interface apparatus 100 returns error information to the transmission-source node. Therefore, the interface apparatus 100 can perform appropriate asynchronous transmission corresponding to the destination address of an asynchronous packet.

With the foregoing structure, when an asynchronous packet is sent to a destination which does not exist in a 1394 network, error information indicating that the transmission destination address does not exist in the 1394 network is sent to the transmission source. Re-transmission of the asynchronous packet is prevented, and thereby the frequency band of the network is efficiently used.

In the above-described embodiment, the portals 103A and 103B of the interface apparatus 100 having a bridge function serve as data transfer apparatuses. The present invention is not limited to this case. The present invention can also be applied to other various data transfer apparatuses which connect buses, and transmit data transferred through its own bus to another bus, if necessary, according to destination information attached to the data.

In the above-described embodiment, the link sections 104A and 104B serve as transmission means. The present invention is not limited to this case. The present invention can also be applied to other various transmission means which determine according to destination information whether the node to which data has been sent is connected to a bus, and, when it is determined that the node is not connected to the bus, transmit predetermined error information to the data transmission source.

In addition, in the above-described embodiment, the link sections 104A and 104B serve as transmission means. The present invention is not limited to this case. The present invention can also be applied to other various transmission means which determine according to destination information whether the bus to which the node serving as the data transmission destination is connected exists on a network, and when it is determined that the bus does not exit, transmit predetermined error information to the data transmission source.

Furthermore, in the above-described embodiment, the link sections 104A and 104B serve as transmission means. The present invention is not limited to this case. The present invention can also be applied to other various transmission means which transmit data from the data transfer apparatus to another data transfer apparatus according to destination information.

In the above-described embodiment, the present invention is applied to the portals 103A and 103B of the IEEE-1394 bridge conforming to the BRAN specification. The present invention is not limited to this case. The present invention can be widely applied to data transfer apparatuses having other various specifications.

What is claimed is:

1. A data transfer apparatus for connecting a plurality of buses and for transmitting data through a first bus to a second bus according to destination information related to the data, the data transfer apparatus being connected to the second bus through a second data transfer apparatus, the data transfer apparatus comprising:
   transferring means for transferring the data from the data transfer apparatus to the second data transfer apparatus according to the destination information;
   determining means for determining, according to the destination information, whether a node serving as a destination of the data is connected to the second bus;
   wherein, when the determining means determines that the node is not connected, a data transmission source receives a predetermined error information signal,
   wherein the predetermined error information signal prevents retransmission;
   wherein at least one packet of the data, transmitted to the node that is not connected, is processed as an error packet;
   wherein the destination information comprises a node ID and a bus ID; and
   wherein the data transfer apparatus is formed of an IEEE-1394 bridge conforming to the BRAIN specification.

2. The data transfer apparatus according to claim 1,
   wherein the means for determining determines, according to the destination information, whether the bus to which the node serving as the destination of the data is connected exists on a network, and
   wherein when the bus does not exist, transmits predetermined error information to the data transmission source.

3. A network system comprising:
   a plurality of buses connected through a data transfer apparatus, the data transfer apparatus for connecting the plurality of buses and for transmitting data transferred through its own bus to a second bus according to destination information attached to the data,
   wherein the data transfer apparatus is connected to the second bus through a second data transfer apparatus, and the data transfer apparatus further comprises:
   transferring means for transferring the data from the data transfer apparatus to the second data transfer apparatus according to the destination information;
   determining means for determining, according to the destination information, whether a node serving as a destination of the data is connected to the second bus , and, when it determines that the node is not connected, a data transmission source receives a predetermined error information,
   wherein the predetermined error information signal prevents retransmission;
   wherein at least one packet of the data, transmitted to the node that is not connected, is processed as an error packet;
   wherein the destination information comprises a node ID and a bus ID;
   wherein the data transfer apparatus is formed of an IEEE-1394 bridge conforming to the BRAN specification.

4. The network system according to claim 3,
   wherein the means for determining determines according to the destination information whether the bus to which the node serving as the destination of the data is connected exists on a network, and, when the bus does not exist, transmits predetermined error information to the data transmission source.

5. A data transfer method for a data transfer apparatus for connecting buses and for transmitting data transferred through a first bus to a second bus according to destination information attached to the data, the data transfer apparatus being connected to the second bus through a second data transfer apparatus, the data transfer method comprising:
- a transferring step of transferring the data from the data transfer apparatus to the second data transfer apparatus according to the destination information;
- a determining step of determining, according to the destination information, whether the node serving as a destination of the data is connected to one of the buses; and
- a transmitting step of, when it is determined that the node is not connected, transmitting predetermined error information to a data transmission source,
- wherein the predetermined error information signal prevents retransmission;
- wherein at least one packet of the data, transmitted to the node that is not connected, is processed as an error packet;
- wherein the destination information comprises a node ID and a bus ID; wherein the data transfer apparatus is formed of an IEEE-1394 bridge conforming to the BRAN specification.

6. The data transfer method according to claim 5, wherein, in the transmitting step, it is determined according to the destination information whether the bus to which the node serving as the destination of the data is connected exists on a network, and, when it is determined that the bus does not exist, predetermined error information is transmitted to the data transmission source.

* * * * *